United States Patent Office 2,827,017
Patented Mar. 18, 1958

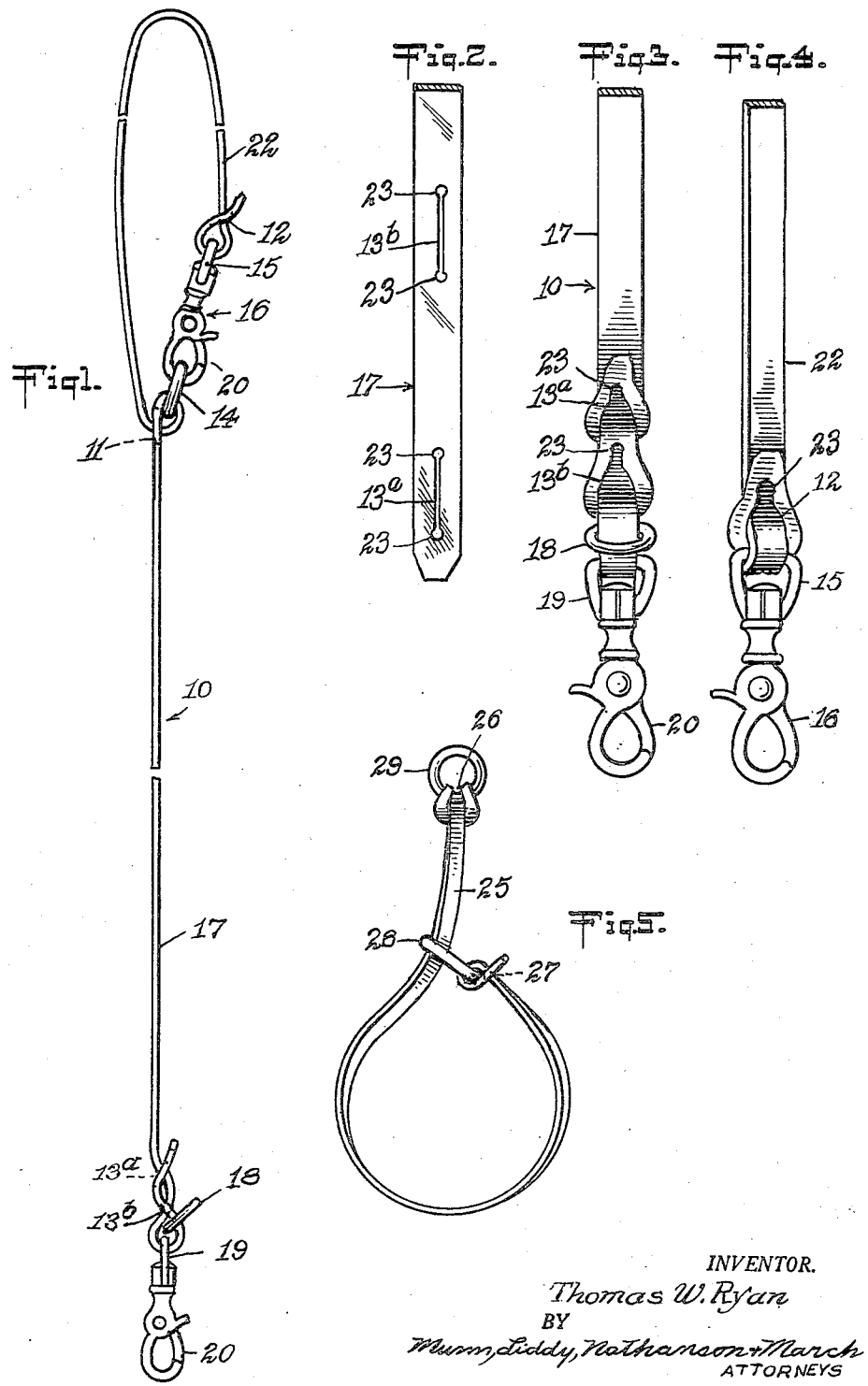

2,827,017

LEASHES FOR ANIMALS

Thomas W. Ryan, Glendale, N. Y.

Application August 17, 1955, Serial No. 529,011

5 Claims. (Cl. 119—109)

This invention relates to leashes for animals, particularly domestic animals such as dogs, cats and the like, although the leash of the invention is obviously not limited to such use.

An object of the invention is to provide an improved animal leash which is extremely simple and economical to fabricate, yet is strong and reliable in use.

Another object of the invention is to provide an improved animal leash as above set forth, which may be fabricated from a flat strip of leather, plastic or the like with a minimum of machine operations being required, and with no machine assembly operations being needed.

Still another object of the invention is to provide an improved animal leash as above characterized, which has a finished, workman-like appearance and is attractive despite the absence of machine assembly operations.

A feature of the invention resides in the provision of an improved animal leash structure adaptable as a choker-type collar when such is desired.

Another feature of the invention resides in the provision of an animal leash as above characterized, wherein a convenient and sturdy hand grip may be provided in the form of a loop at one end of the leash.

Other features and advantages will hereinafter appear.

In the accompanying drawings:

Fig. 1 is an elevational view of an improved animal leash made in accordance with the invention.

Fig. 2 is a detail in elevation of the lower end of the leash shown in Fig. 1, prior to its assembly.

Fig. 3 is a view of the lower leash end shown in Figs. 1 and 2, assembled to a ring and to a catch or clasp.

Fig. 4 is an elevational view of the upper end of the leash of Fig. 1, showing the structure by which it is attached to the catch or clasp.

Fig. 5 is an elevational view of a leash structure made in accordance with the invention, set up as a choker collar.

Referring to Figs. 1–4, the improved animal leash as shown comprises a flat, elongate strap or strip 10 which may be advantageously formed of leather, tough plastic or other suitable material. The strip 10 is provided with a plurality of longitudinal slits or cuts of the type clearly illustrated in Fig. 2, one slit (indicated at 11) being disposed intermediate the ends of the strip, another slit 12 being disposed adjacent the upper end of the strip, and a pair of slits 13a and 13b being disposed adjacent the lower end of the strip.

By the present invention the intermediate slit 11 is utilized to provide a convenient loop-type of hand grip for the leash, and to accomplish this the strip 10 is passed through a metal ring 14, and then folded and passed through the slit 11, as shown in Fig. 1, so that the ring 14, which may be made of metal, plastic, or any other suitable material, is included in the loop thus formed. I thereby effect in a very simple and convenient manner, and without requiring machine assembly operations, a connection means to a portion of the strip 10 intermediate its ends.

The upper end of the strip 10 may be passed through the eye 15 of the usual catch 16, and the strip thereafter folded around the eye as shown in Fig. 1. This may be done in several ways; for example, the strip may be passed through the slit 12 to form the said connection between it and the catch 16, or it may be folded in a manner hereinafter more fully explained. The above assembly operation may be carried out either prior or subsequent to the attaching of the ring 14 to the intermediate portion of the strap, although it can be done in a slightly more facile manner prior to the attachment of the ring 14 to the intermediate portion of the strip.

The lower end of the strip 10, indicated generally by the numeral 17 in Figs. 1, 2 and 3, may be passed through a metal ring 18 and the eye 19 of a catch 20, and thereafter the end may be passed through the slit 13b with the ring 18 and eye 19 remaining in the loop formed thereby. The entire strip may then be passed through the end slit 13a, whereupon the connection will appear as indicated in the plan view of Fig. 3 and in the side elevational showing of Fig. 1.

By this organization I effect, without requiring machine assembly operations, a very secure attachment of the strip 10 to the ring 18 and eye 19, and a connection which is at the same time attractive and ornamental in its appearance. The catch 16 may now be attached to the ring 14 to provide the loop indicated generally by the numeral 22, which will constitute a convenient and secure hand grip for the leash. Should a larger loop be desired, for example, for attachment to a post or the like, or should a shorter leash be required, the catch 16 may be attached to the ring 18 at the lower portion of the leash. When this is done, a shorter leash is provided and one which has a large loop.

It will be noted that each end of each slit is provided with enlarged rounded ends 23, by which construction ripping of the leather at each end of each slit is prevented.

There is also provided by the present invention a novel, inexpensive and advantageous choker collar as seen in Fig. 5. In this figure a strap 25 is provided at its ends with slits 26 and 27, by which rings 28 and 29 may be secured to said ends in the manner of securement of the eye 15 of the catch 16 to the upper end of the strip 10 shown in Figs. 1 and 4.

While the method by which the rings and clasps are attached to the ends of the strip may seem to be best carried out by passing the strip through the slits, as described above, another method may be advantageously employed, particularly where the slits are not large enough to permit the passage of the rings and clasps as an assemblage which has been previously effected. This alternative method, particularly adaptable to the choker collar shown in Fig. 5, involves merely passing the slitted end of the strap 25 through a ring, spreading the slitted portion apart and pulling the ring through said slitted portion. The strip end may thereafter be readily folded and arranged as shown in Fig. 4, to constitute an attractive and secure connection.

It will be understood that the clasps 16 and 20 may likewise be secured to the ends of the strip, the operation involving passing the slitted end through the eye 15 and thereafter passing the clasp, free end first, through the slit. The slitted portion of the strip is then folded around, to form the connection as shown in Fig. 4.

By the above construction I have provided a novel and advantageous animal leash and choker collar, characterized by the absence of machine assembly operations involving rivets, eyelets, stitching and the like, and characterized very appreciably by strength and reliability while at the same time presenting an attractive and ornamental appearance.

While the invention has been described in some detail, it will be understood that variations and modifications may be made without departing from the spirit of the invention or the scope of the appended claims.

I claim:

1. An animal leash comprising a cord having a slit intermediate its ends and appreciably spaced therefrom, a portion of said cord adjacent the slit extending back on itself and passing through the slit to form a small loop; a ring passing through the said loop; and means including a releasable clasp connected to an end portion of the cord, releasably securing said end portion to said ring, said cord between the slit and said end portion forming a relatively large loop.

2. An animal leash comprising a leash cord having a pair of longitudinally-spaced slits disposed adjacent one end, a portion of said cord which contains one of said slits and which is located adjacent the other slit being folded back on itself to form a loop for encircling a portion of a clasp, said cord portion extending through said other slit, and another portion, thereby to form a double, sliding connection between the ends of the loop of the cord extending through the slit in the said first portion.

3. An animal leash comprising a flat cord having a slit intermediate its ends, a portion of said cord extending back on itself adjacent the slit and passing through the latter to form a small loop; a ring passing through the said loop; and means including a releasable clasp connected to an end portion of the cord, releasably securing said end portion to said ring, said cord between the slit and said end portion forming a relatively large loop, said end portion having a pair of longitudinally spaced slits, part of said cord containing one of said slits and located adjacent the other slit passing through the clasp, being folded back on itself to form a loop, and passing through said other slit, and another part of the cord passing through the slit in the said first portion, thereby to form a double, sliding connection between the ends of the second-mentioned loop.

4. The invention as defined in claim 1 in which the cord comprises a flat strip, and in which the said slit has enlarged, rounded ends and extends longitudinally of the strip.

5. The invention as defined in claim 2 in which the cord comprises a flat strip, and in which the slits extend longitudinally thereof and have enlarged rounded ends.

References Cited in the file of this patent

UNITED STATES PATENTS

| | | |
|---|---|---|
| 1,127,249 | Hughes | Feb. 2, 1915 |
| 1,505,423 | Prouty et al. | Aug. 19, 1924 |
| 1,509,781 | Roth | Sept. 23, 1924 |
| 1,924,596 | Davis | Aug. 29, 1933 |
| 2,289,802 | Norton | July 14, 1942 |